United States Patent
Pirko (10) Patent No.: US 9,866,470 B2
(45) Date of Patent: Jan. 9, 2018

(54) MULTIPLE ACTIVE LINK AGGREGATORS

(71) Applicant: Red Hat, Inc., Raleigh, NC (US)

(72) Inventor: Jiri Pirko, Chocen (CZ)

(73) Assignee: Red Hat, Inc., Raleigh, NC (US)

(*) Notice: Subject to any disclaimer, the term of this patent is extended or adjusted under 35 U.S.C. 154(b) by 24 days.

(21) Appl. No.: 14/164,063

(22) Filed: Jan. 24, 2014

(65) Prior Publication Data

US 2015/0215209 A1    Jul. 30, 2015

(51) Int. Cl.
*H04L 12/709* (2013.01)
*H04L 12/935* (2013.01)

(52) U.S. Cl.
CPC ............ *H04L 45/245* (2013.01); *H04L 49/30* (2013.01); *Y02B 60/33* (2013.01)

(58) Field of Classification Search
CPC ........ H04L 45/245; H04L 49/30; Y02B 60/33
See application file for complete search history.

(56) References Cited

U.S. PATENT DOCUMENTS

| | | | |
|---|---|---|---|
| 7,756,029 B2 | 7/2010 | Licardie et al. | |
| 7,881,230 B2* | 2/2011 | Vinayagam | H04L 41/0886 370/255 |
| 8,059,638 B2 | 11/2011 | Nam et al. | |
| 8,139,492 B1* | 3/2012 | Peterson | H04L 45/00 370/238 |
| 8,270,290 B2 | 9/2012 | Casey et al. | |
| 8,284,791 B2 | 10/2012 | Unger et al. | |
| 8,369,332 B2 | 2/2013 | Kotalwar et al. | |
| 8,462,774 B2 | 6/2013 | Page et al. | |
| 8,565,085 B2* | 10/2013 | Kotrla | H04L 45/00 370/232 |
| 8,886,831 B2* | 11/2014 | Tirumalai | H04Q 3/0087 370/218 |
| 9,042,234 B1* | 5/2015 | Liljenstolpe | H04L 45/00 370/238 |
| 2003/0187948 A1* | 10/2003 | Bellon | G06F 11/2289 709/217 |
| 2007/0263707 A1* | 11/2007 | Theodoras, II | H04L 5/1423 375/220 |

(Continued)

FOREIGN PATENT DOCUMENTS

WO   2011/105941 A1   9/2011
WO   2013/017017 A1   2/2013

OTHER PUBLICATIONS

DevCentral, "LACP Behavior", https://devcentral.f5.com/questions/lacp-behavior, dated Mar. 16, 2010, 7 pages.

(Continued)

*Primary Examiner* — Hashim Bhatti
(74) *Attorney, Agent, or Firm* — Lowenstein Sandler LLP (57) ABSTRACT

A computing device identifies a plurality of network interface controllers (NICs) of a computing device that are available for link aggregation. The computing device establishes a first link aggregator for a first set of the plurality of NICs and a second link aggregator for a second set of the plurality of NICs. The computing device activates the first link aggregator. The computing device activates the second link aggregator while maintaining the first link aggregator active to cause the first link aggregator and the second link aggregator to simultaneously handle network communications.

19 Claims, 5 Drawing Sheets

(56) References Cited

U.S. PATENT DOCUMENTS

| | | | |
|---|---|---|---|
| 2008/0016178 A1* | 1/2008 | Portugali | G06F 11/1464 709/217 |
| 2008/0181196 A1* | 7/2008 | Regan | H04L 45/00 370/351 |
| 2008/0219281 A1* | 9/2008 | Akin | H04W 72/0453 370/419 |
| 2010/0011230 A1* | 1/2010 | Mater | G06F 1/3215 713/320 |
| 2011/0194562 A1* | 8/2011 | Simmons | H04L 45/02 370/395.31 |
| 2012/0182866 A1* | 7/2012 | Vinayagam | H04L 45/245 370/228 |
| 2013/0148512 A1* | 6/2013 | Sarwar | H04L 41/042 370/252 |
| 2013/0336166 A1* | 12/2013 | Swain | H04L 61/2038 370/255 |
| 2014/0119193 A1* | 5/2014 | Anand | H04L 47/125 370/237 |
| 2014/0133486 A1* | 5/2014 | Sivasankar | H04L 47/41 370/392 |
| 2014/0307540 A1* | 10/2014 | Duda | H04L 41/0866 370/220 |
| 2014/0313932 A1* | 10/2014 | Saltsidis | H04L 41/0668 370/254 |
| 2015/0026321 A1* | 1/2015 | Ravinoothala | H04L 47/125 709/222 |
| 2015/0172112 A1* | 6/2015 | Itkin | H04L 45/245 370/216 |

OTHER PUBLICATIONS

HP, "HP Virtual Connect Traffic Flow", http://h20000.www2.hp.com/bc/docs/support/SupportManual/c03154250/c03154250.pdf, Jan. 2012, 22 pages.

IBM Corporation, "Media Access Control (MAC) Address", http://publib.boulder.ibm.com/infocenter/zvm/v6r2/index.jsp?topic=%2Fcom.ibm.zvm.v620.hcpa6%2Fmediaacc.htm, 2012, 4 pages.

* cited by examiner

MULTIPLE ACTIVE LINK AGGREGATORS

TECHNICAL FIELD

Implementations of the present disclosure relate to link aggregation, and more specifically to multiple active link aggregators.

BACKGROUND

Network interface controllers (NICs), also known as network adapters, network interface controllers, network interface cards, or local area network (LAN) adapters, are hardware devices that handle interfaces to computer networks and allow a computing device, such as a network-capable device, to access the respective networks. The NIC has a read-only memory chip that stores a unique number, the media access control (MAC) address. The MAC address identifies the device uniquely on the network (e.g., LAN). The NIC can be both Layer 1 (physical layer) and Layer 2 (data link layer) device, since it provides physical access to a networking medium and provides a low-level addressing system, typically using the MAC address. The NICs allow users of the computing devices to connect over wired or wireless networks.

The bandwidth used by a compute node in a data center typically exceeds the capabilities of a single NIC. Accordingly, link aggregation technologies are used to bundle network bandwidth and provide redundancy. In conventional systems, only a single aggregator can be active at a given time. While some conventional systems can have multiple aggregators, one aggregator is active and the others serve as backup aggregators. Should one of the backup aggregators become active, the originally active aggregator becomes a backup aggregator.

BRIEF DESCRIPTION OF THE DRAWINGS

The present disclosure is illustrated by way of example, and not by way of limitation, and can be more fully understood with reference to the following detailed description when considered in connection with the figures.

DETAILED DESCRIPTION

Described herein are methods and systems for providing multiple active link aggregators. Link aggregation is the generation of a single logical channel from the bundling of multiple physical ports. Link aggregation is performed to provide redundancy for network interface controllers (NICs), to provide bandwidth that is greater than a single NIC can provide, to perform load balancing, and for other reasons. Conventional systems, however, can only have one active aggregator. Accordingly, any additional aggregators are in-active and can be used for backup. This is problematic because the resources of the backup aggregator(s) are under-utilized.

Implementations of the present disclosure provide a mechanism for a computing system to use available aggregators concurrently. In one implementation, processing logic identifies multiple (NICs) of a computing device that are available for link aggregation. The processing logic then establishes a first link aggregator for a first set of NICs and establishes a second link aggregator for a second set of NICs. The processing logic then activates the first link aggregator. The processing logic also activates the second link aggregator while maintaining the first link aggregator active. With both the first link aggregator and second link aggregator being active, they both can simultaneously handle network communications. Both link aggregators can be selected to handle data in any direction with respect to the computing device (e.g., incoming, outgoing).

In the following description, numerous details are set forth. It will be apparent, however, to one skilled in the art, that the present disclosure may be practiced without these specific details. In some instances, well-known structures and devices are shown in block diagram form, rather than in detail, to avoid obscuring the present disclosure.

Some implementations are described herein with reference to physical switches. However, it should be appreciated that the principles introduced and described with reference to physical switches also apply to virtual network switches. Accordingly, implementations of the present disclosure are not limited to physical switches, and those implementations describing physical switches may be modified for use with virtual network switches.

Figure 1:
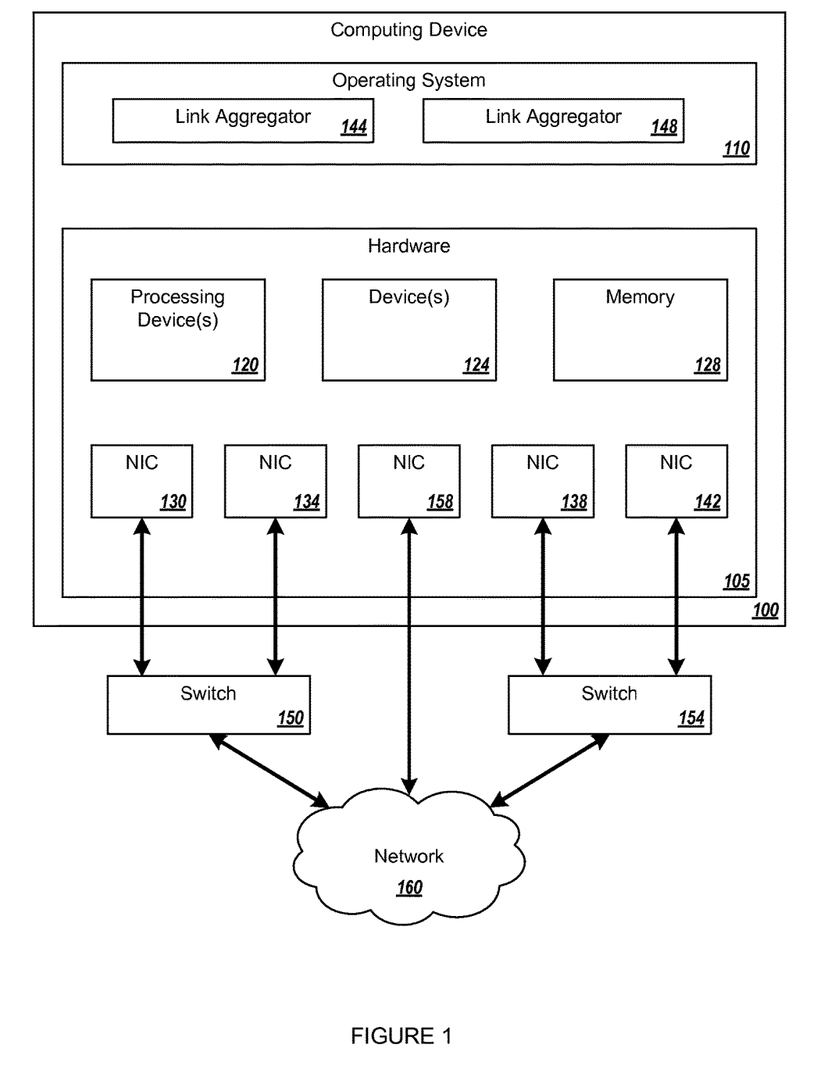
FIG. 1 is a block diagram that illustrates an example system architecture in which link multiple active link aggregators may be configured, in accordance with one implementation of the present application.

FIG. 1 block diagram that illustrates an example system architecture in which link multiple active link aggregators may be configured, in accordance with one implementation of the present application. The example system architecture can include a computing device 100. The computing device 100 may be a rackmount server, a workstation, a desktop computer, a notebook computer, a tablet computer, a mobile phone, a palm-sized computing device, a personal digital assistant (PDA), etc. The computing device 100 includes hardware 105, which may include one or more processors 120, one or more devices 124, memory 128, and multiple physical NICs 130-142, and other hardware components. The memory 128 may include volatile memory devices (e.g., random access memory (RAM)), non-volatile memory devices (e.g., flash memory), and/or other types of memory devices. The hardware 105 may also be coupled to external storage (not shown) via a direct connection or a network. The computing device 100 may be a single machine or multiple machines arranged in a cluster.

Each of the devices 124 may be a physical device that is internal or external to the computing device 100. Examples of internal devices include a graphics card, hardware RAID controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive, external I/O devices, etc.

NICs 130-142 provide a hardware interface between the computing device 100 and a network. NICs may support wired standards, wireless standards, or both. The NICs 130-142 may be Ethernet controllers, Wi-Fi controllers, Token Rings, InfiniBand, and so forth. The NICs 130-142 provide functionality to communicate over a network using specific physical layer (OSI layer 1) and data link layer (OSI layer 2) standards (e.g., Ethernet, Wi-Fi, Token Ring, InfiniBand, etc.). Ethernet NICs typically support 10 Megabits per second (Mbits/s), 100 Mbits/s, 1000 Mbits/s, 10 Gigabits per second (Gbits/s) or 40 Gbits/s. Wi-Fi NICs typically support between 54 Mbits/s and 866 Mbits/s. Each NIC 130-142 includes a unique media access control (MAC) address, which may be stored in a read only memory of the NIC 130-142.

The computing device 100 includes an operating system (OS) 110. The computing device may additionally include a server (e.g., a web server), a database and/or database management system (DBMS), a hypervisor and/or virtual machines, or other functionality. The computing device 100 may be configured to manage many connections to other devices over a network. Accordingly, the computing device may consume large amounts of bandwidth, and may accordingly have multiple NICs 130-142 to handle the large bandwidth usage.

To optimally use the multiple NICs 130-142, the computing device 100 may establish one or more link aggregators 144, 148 using some or all of the NICs 130-142. After establishing more than one link aggregator 144, 148, the computing device 100 may activate each of the established link aggregators 144, 148 without deactivating any previously activated link aggregators 144, 148. Each of the activated link aggregators 144, 148 can simultaneously handle network communications (incoming, outgoing), as further described in conjunction with FIG. 3.

To ensure that data (e.g., incoming, outgoing) is handled by the appropriate link aggregator 144, 148, the computing device 100 may assign an address to each link aggregator. The computing device 100 can select an address from an available set of addresses that have previously been allocated for link aggregation. In other implementations, the computing device 100 can generate an address for each link aggregator using any address protocol or technique, such as medium access control (MAC). In implementations, the computing device 100 associates a different MAC address with each link aggregator 144, 148. The MAC address for each link aggregator 144, 148 can be broadcast to other components within the computing device 100. Alternatively, any device can access each link aggregator 144, 148 to determine the MAC address of the link aggregator 144, 148. Communications can be directed to a particular link aggregator 144, 148 using the address. When the computing device 100 uses the link aggregators 144, 148, the computing device 100 can perform load balancing techniques to select a link aggregator to handle communications, as further described in conjunction with FIG. 4.

In one example, the operating system 110 can receive a communication to be handled by one of the link aggregators 144, 148. The communication can originate from within the computing device 100 or from another source, such as from another device via the network 160. For example, an application on the computing device 100 can generate or receive a User Datagram Protocol (UDP) packet. Other types of communications are contemplated, such as frames (LACPDU), packets, and the like. The application can send the UDP packet to an operating system, such as by passing the UDP packet through a socket to a kernel. The operating system 110 identifies a destination address (e.g., a MAC address) for the UDP packet and then decides how to send the UDP packet to the destination. The operating system 110 selects a link aggregator using the techniques described herein. Then, the operating system 110 (e.g., the kernel) can pass the UDP packet through a driver to the selected link aggregator. The selected link aggregator uses a NIC associated with the selected link aggregator to send the UDP packet to a switch 150, 154 and the switch uses the destination address to forward the UDP packet to the appropriate path (e.g., a port of the switch) toward the destination.

In implementations, the operating system 110 can use an NIC 158 to implement a bridge (e.g., a Level 2 bridge) through a network 160. To implement the bridge, the operating system 110 can provide addresses of link aggregators 144, 148 to the NIC 158. The NIC 158 can receive communications from any source via the network 160. The NIC 158 can forward the received communications to a link aggregator 144, 148 using the addresses of link aggregators 144, 148. The NIC 158 can also receive communications from a link aggregator 144, 148 and can forward the communications toward the destination via the network 160.

In implementations, the operating system 110 establishes and/or activates the aggregators 144, 148 according to a link aggregation control protocol (LACP). LACP is a link aggregation protocol that can be used to aggregate links that share the same switch 150, 154. That is, two NICs that are both connected to the same switch that supports LACP may be configured into a link-layer level link aggregation that uses the LACP protocol. LACP aggregated links may utilize all aggregated NICs for both uplinks and downlinks while non-LACP aggregated links may use all NICs for uplinks but only a single NIC for the downlink.

In implementations, the operating system 110 applies one or more aggregation rules to establish, activate and/or select the link aggregators. Aggregation rules may be used to associate individual NICs with specific link aggregators. In some implementations, NICs with higher weights are better capable of processing data than NICs with lower weights. The operating system 110 can use the weights when establishing a link aggregator. The operating system 110, for example, can establish a link aggregator using the two NICs with the highest weight, thereby establishing a link aggregator that is highly capable of processing data. In another example, the operating system 110 can attempt to establish multiple link aggregators that are equally capable of processing data. For example, when the computing system includes four NICs, the operating system 110 can establish a first link aggregator from the NICs with the highest and lowest weights and a second link aggregator from the NICs with weights in the middle. In an example, the operating system 110 can assign weights to NICs based on their link speeds, where higher speed NICs are assigned a higher weighting than lower speed NICs, based on switch connectivity, where a higher weighting can be assigned to NICs that are connected to the same switch than to NICs that are connected to different switches. This is because typically higher performance gains can be realized for aggregations of links that are to the same switch. A third aggregation rule may assign a higher weighting to NICs that are connected to switches that support LACP than to NICs that are connected to switches that do not support LACP. Other aggregation rules may also be used, such as rules that are related to a number of aggregated ports, a total bandwidth of all ports, links within the aggregator, or LACP port priority. Any of the aggregation rules can be created or set by a system administrator. In some implementations, a system administrator creates a rule and the rule is transferred (e.g., via LACPDU packets) to the computing device 100. The aggregation rules may be used in combination to determine an optimal link aggregator to handle a communication.

Multiple different types of link aggregation configurations are possible and can be defined by a system administrator or can be predefined (e.g., based on a specific type of hardware or purpose). For example, a first type of link aggregation configuration may combine multiple links in parallel to increase throughput above what a single NIC can sustain. A second type of link aggregation configuration may combine links in such a way that one or more secondary links provide redundancy in case a primary link fails. Other types of link configurations are also possible. An aggregated link may have a single logical address that is shared by multiple NICs or a single physical address that is shared by the multiple NICs.

Figure 2:
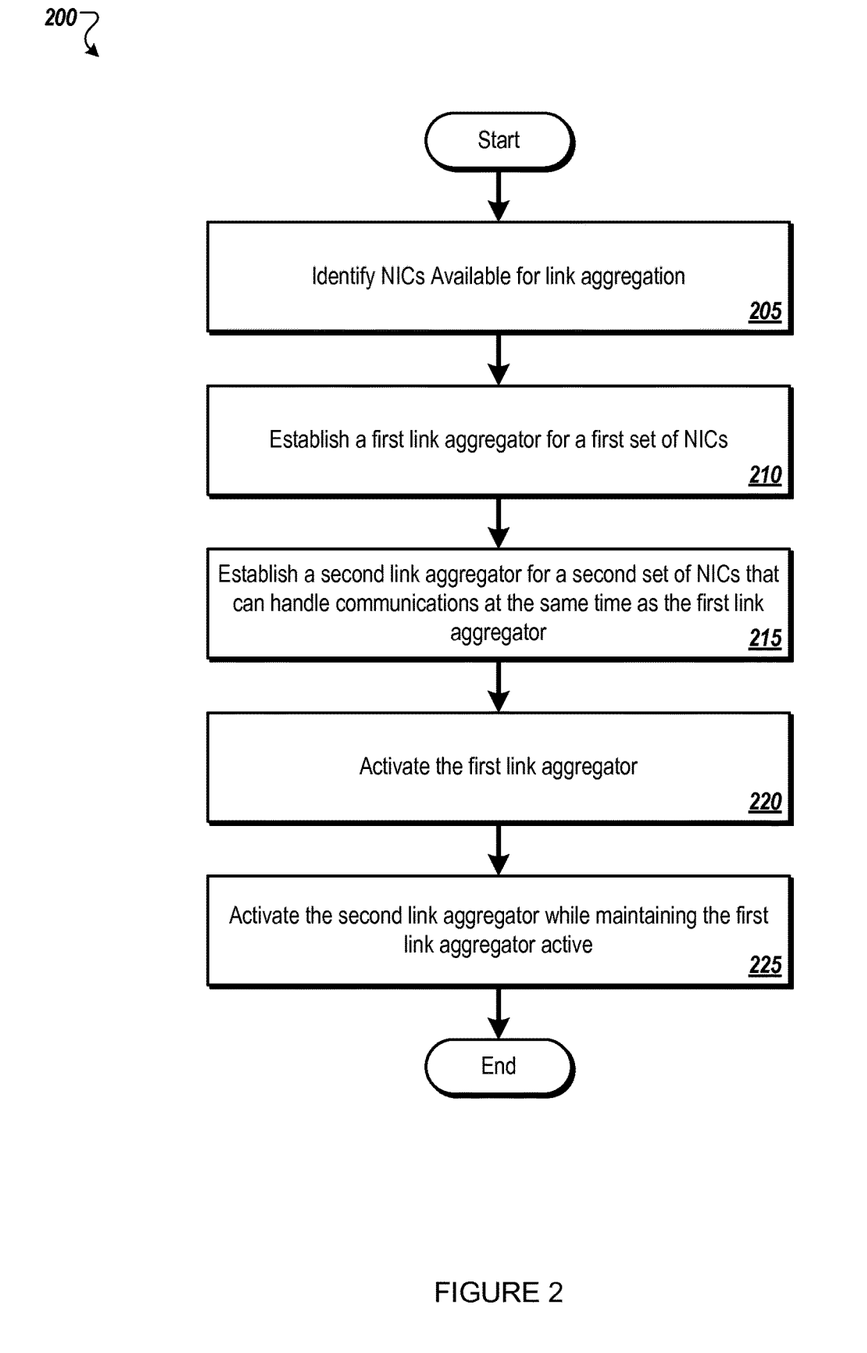
FIG. 2 is a flow diagram illustrating one implementation for a method 200 of establishing and activating multiple link aggregators.
Figure 3:
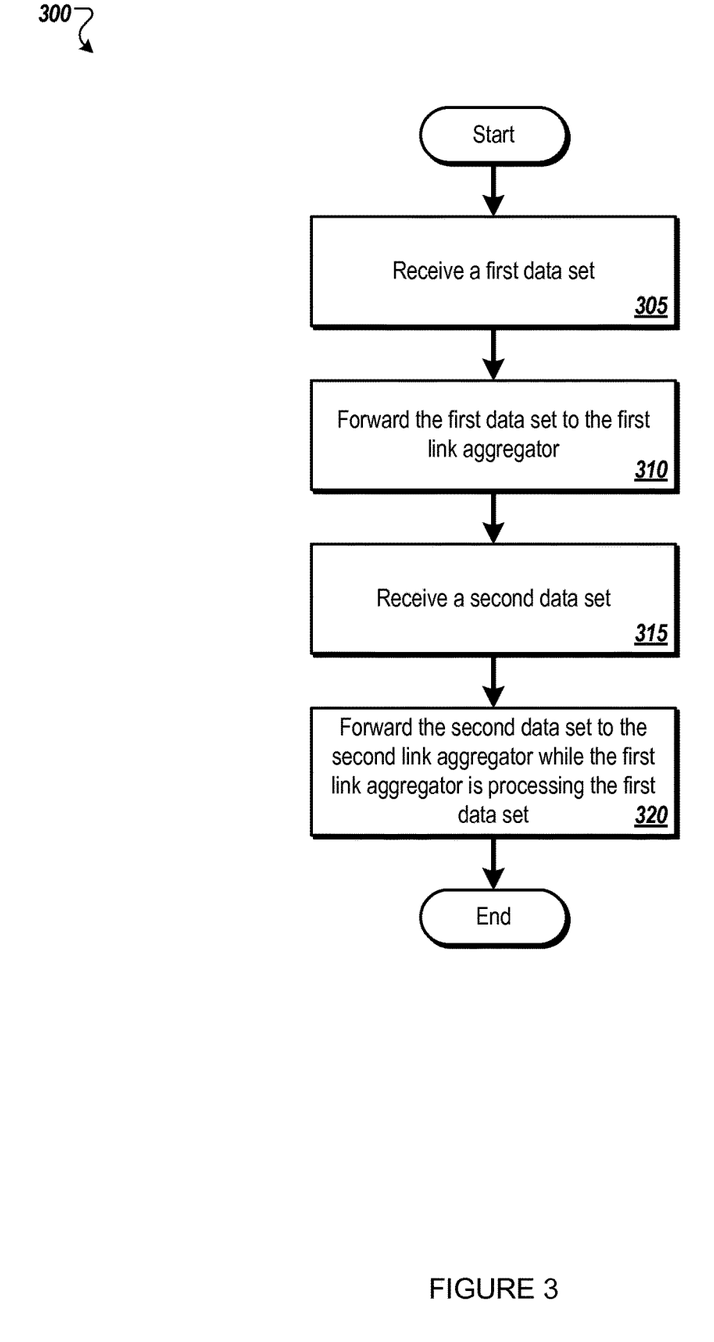
FIG. 3 is a flow diagram illustrating one implementation for a method 300 of using multiple aggregators to simultaneously handle communications, in accordance with one implementation of the present disclosure.
Figure 4:
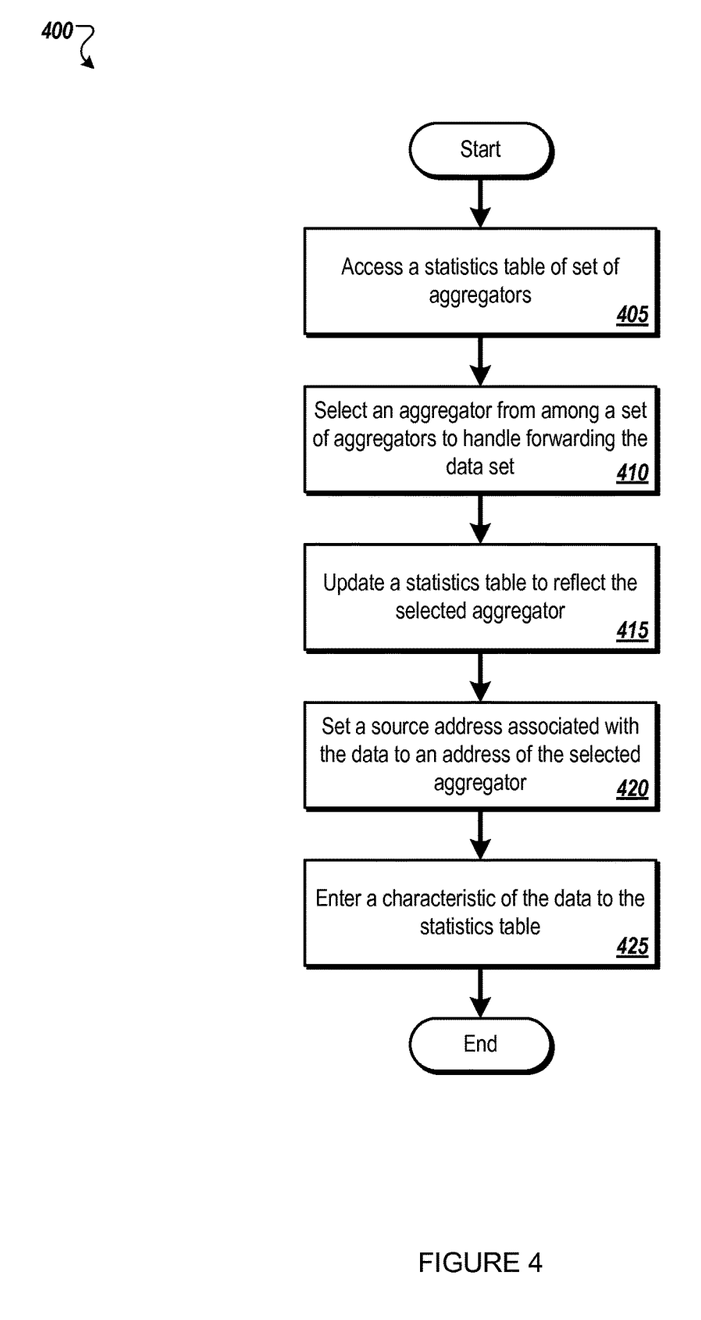
FIG. 4 is a flow diagram illustrating one implementation for a method 400 of selecting a link aggregator to handle a communication, in accordance with one implementation of the present disclosure.

FIGS. 2-4 are flow diagrams of various implementations of methods related to multiple active link aggregators that can simultaneously handle communication. The methods are performed by processing logic that may include hardware (circuitry, dedicated logic, etc.), software (such as is run on a general purpose computer system or a dedicated machine), or a combination of both. In one implementation, the methods are performed by an operating system 110 running multiple link aggregators, such as link aggregators 144, 148 of FIG. 1.

For simplicity of explanation, the methods are depicted and described as a series of acts. However, acts in accordance with this disclosure can occur in various orders and/or concurrently, and with other acts not presented and described herein. Further, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 2 is a flow diagram illustrating one implementation for a method 200 of establishing and activating multiple link aggregators. At block 205 of method 200, processing logic identifies multiple (NICs) of a computing device that are available for link aggregation. In one implementation, a system administrator provides a list or grouping of available NICs. In some implementations, the processing logic determines whether a list of available NICs has been provided. If no such list is available, processing logic may use one or more probes to identify NICs that are available for link aggregation.

At block 210, processing logic establishes a first link aggregator for a first set of NICs. At block 215, processing logic establishes a second link aggregator for a second set of NICs. The second link aggregator can handle communications at the same time as the first link aggregator. In some implementations, establishing the aggregators at blocks 210 and 215 includes assigning different addresses to or associating different addresses with the first and second aggregators.

At block 220, the processing logic activates the first link aggregator. At block 225, the processing logic activates the second link aggregator while maintaining the first link aggregator active. In implementations, the processing logic activates the second link when a certain event occurs (e.g., when the first link aggregator has reached a threshold data throughput capacity, an action by a system administrator, upon detection of data of a specific type of data (e.g., UDP, LACPDU).). The events may be defined as part of aggregation rules and/or aggregation configuration (e.g., as previously provided by a system administrator). In addition, the second link aggregator to be activated can be chosen based on the aggregation rules. For example, the second link can be established in response to receiving data of a specific protocol or type of data (e.g., UDP, LACPDU). The second link aggregator can be established specifically to support LACP, for example. In another example, the second link can be established to provide high data throughput based on NIC link speeds. In other implementations, the processing logic activates all link aggregators that have previously been established, such as at blocks 205 and 210.

FIG. 3 is a flow diagram illustrating one implementation for a method 300 of using multiple aggregators to simultaneously handle communications (e.g., incoming, outgoing). At block 305 of method 300, processing logic (e.g., operating system 110 of FIG. 1) receives a first data set (e.g., one or more data packets) from any source (e.g., from within the computing system 100 of FIG. 1 or via a network 160 of FIG. 1). At block 310, the processing logic selects a first link aggregator to process the first data set. One example of a selection mechanism is discussed in more detail below in conjunction with FIG. 4. At block 315, the processing logic receives a second data set. At block 320, the processing logic selects a second link aggregator, such as using techniques described in conjunction with FIG. 4, to process the second data set. The first link aggregator and the second link aggregator can process their respective data sets at the same time. In implementations, the processing logic selects the second link aggregator while the first link aggregator processes the first data packet.

FIG. 4 is a flow diagram illustrating one implementation for a method 400 of selecting a link aggregator to handle a communication according to implementations. The link aggregator can be selected to handle data in any direction with respect to the computing device 100 of FIG. 1 (e.g., incoming, outgoing). At block 405 of method 400, processing logic (e.g., operating system 110 of FIG. 1) accesses a statistics table of a set of aggregators. The statistics table can include information about multiple aggregators, such as information related to load, capacity, bandwidth, or any other attribute of the link aggregators or their respective underlying NICs. At block 410, the processing logic selects a link aggregator from among the set of link aggregators that are listed in the statistics table. In implementations, the processing logic applies aggregation rules and/or aggregation configuration settings to the statistics table to determine which link aggregator to use. For example, the processing logic can select the link aggregator that is under the least amount of load to handle the communication. In another example, the processing logic can select the link aggregator that is most capable of handling data of a specific protocol or type of data (e.g., UDP, LACPDU). In a further example, the processing logic can select the link aggregator with the highest bandwidth capacity. In yet another example, the processing logic can select a link aggregator where all of the NICs that comprise the link aggregator are connected to the same switch.

At block 415, the processing logic can update the statistics table to reflect the selected aggregator. When updating the statistics table, the processing logic can enter a characteristic of the communication, such as a packet length, a data size, or the like at block 420. For example, to indicate load of a link aggregator, the statistics table can include, for each link aggregator, a length of a communication that is being processed by the link aggregator. The statistics table can also include a length of a communication that is in a processing queue of a link aggregator. In some instances, once the processing logic updates the statistics table with this information, the selected link aggregator is no longer the least loaded link aggregator. Subsequent communications can be handled by another active link aggregator.

In some implementations, at block 425, the processing logic can set a source address associated with the communication to an address of the selected aggregator. In some instances, the communication can be associated with an address of a first link aggregator. When the processing logic selects a second link aggregator to handle the communication, then the processing logic can change the source address from the first link aggregator to the second link aggregator. In implementations, when handling a stream of data (e.g., multiple data packets generated by a specific application), the source address for the stream of data is set to the selected link aggregator such that the entire stream of data is processed by the selected link aggregator.

Figure 5:
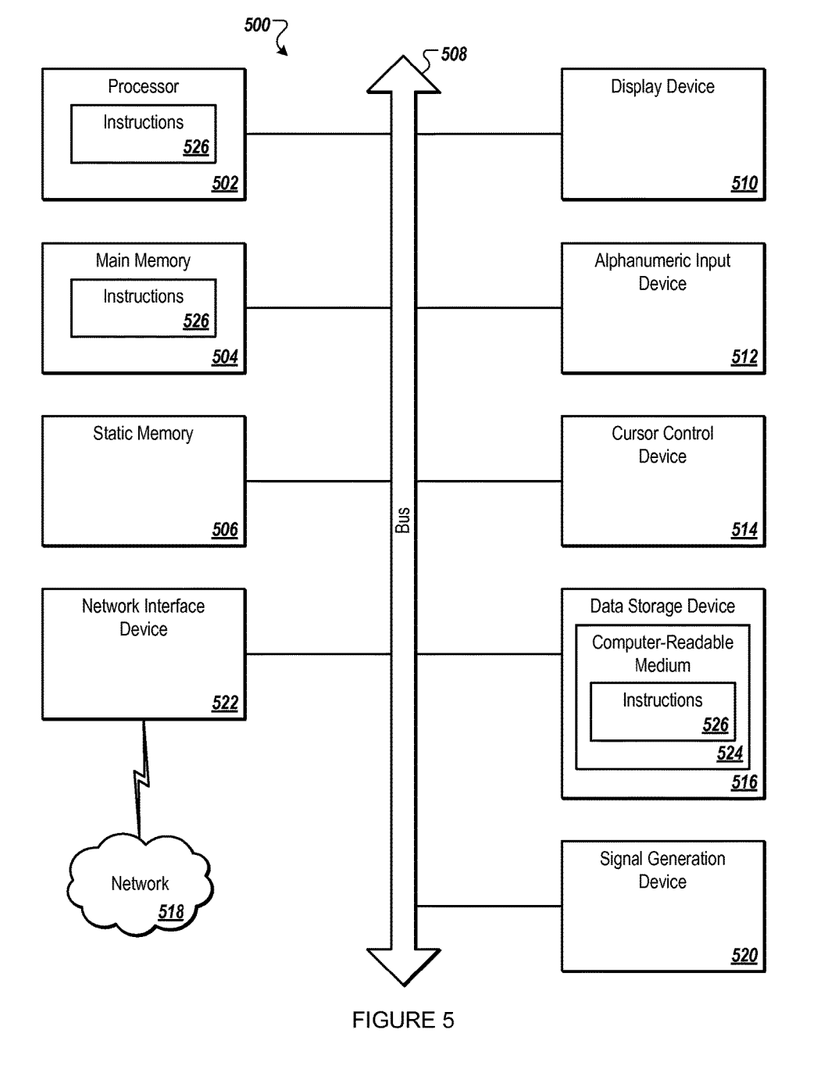
FIG. 5 illustrates a diagrammatic representation of a machine in the example form of a computer system, in accordance with one implementation of the present disclosure.

FIG. 5 illustrates a diagrammatic representation of a machine in the exemplary form of a computer system 500 within which a set of instructions, for causing the machine to perform any one or more of the methodologies discussed herein, may be executed. The computer system 500 may correspond to computing device 100 of FIG. 1. In implementation of the present disclosure, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

The processing device 502 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 502 may therefore include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computer system 500 may further include one or more network interface devices 522 (e.g., NICs). The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions 554 embodying any one or more of the methodologies or functions described herein (e.g., operating system 110, link aggregators 144, 148 of FIG. 1). The instructions 554 may also reside, completely or at least partially, within the main memory 504 and/or within the processing device 502 during execution thereof by the computer system 500; the main memory 504 and the processing device 502 also constituting machine-readable storage media.

While the computer-readable storage medium 524 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present disclosure. The term "computer-readable storage medium" shall accordingly be taken to include, but not be limited to, non-transitory media such as solid-state memories, and optical and magnetic media.

Any modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "activating", "establishing", "detecting", "receiving," "selecting," "modifying", "accessing," "updating," "setting," "entering," "probing," "associating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Implementation of the present disclosure also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present disclosure is not described with reference to any particular programming language. It will be appreciated that a variety of programming languages may be used to implement the teachings of the invention as described herein.

It is to be understood that the above description is intended to be illustrative, and not restrictive. Many other implementations will be apparent to those of skill in the art upon reading and understanding the above description. Although the present disclosure has been described with reference to specific implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   identifying a plurality of network interface controllers (NICs) of a computing device that are available for link aggregation;
   establishing a first link aggregator for a first set of the plurality of NICs, wherein the first link aggregator handles incoming and outgoing network communications;
   establishing a second link aggregator for a second set of the plurality of NICs;
   activating, by a processing device, the first link aggregator;
   activating, by the processing device, the second link aggregator while maintaining the first link aggregator active;
   associating a first medium access control (MAC) address with the first link aggregator;
   associating a second MAC address with the second link aggregator;
   receiving a first incoming data packet and a second incoming data packet;
   selecting, using the first MAC address, the first link aggregator to process the first incoming data packet; and
   selecting, using the second MAC address, the second link aggregator to process the second incoming data packet, wherein the second incoming data packet and the first incoming data packet are processed at a same time.

2. The method of claim 1, wherein the second link aggregator is selected while the first link aggregator processes the first data packet.

3. The method of claim 1, wherein selecting the second link aggregator comprises accessing a statistics table to determine which link aggregator is under less load.

4. The method of claim 3 further comprising:
   updating the statistics table to reflect the selected link aggregator; and
   setting a source address associated with the data to the selected link aggregator.

5. The method of claim 4, wherein updating the statistics table comprises entering a characteristic of the data to the statistics table.

6. The method of claim 1, wherein identifying the plurality of NICs that are available for link aggregation comprises receiving a list of the plurality of NICs.

7. The method of claim 1, wherein identifying the plurality of NICs that are available for link aggregation comprises probing the computing device to identify the plurality of NICs.

8. A non-transitory computer readable storage medium having instructions that, when executed by a processing device, cause the processing device to:
   identify a plurality of network interface controllers (NICs) of a computing device that are available for link aggregation;
   establish a first link aggregator for a first set of the plurality of NICs, wherein the first link aggregator handles incoming and outgoing network communications;
   establish a second link aggregator for a second set of the plurality of NICs;
   activate, by the processing device, the first link aggregator;
   activate, by the processing device, the second link aggregator while maintaining the first link aggregator active;
   associate a first medium access control (MAC) address with the first link aggregator;
   associate a second MAC address with the second link aggregator;
   receive a first incoming data packet and a second incoming data packet;
   select, using the first MAC address, the first link aggregator to process the first incoming data packet; and
   select, using the second MAC address, the second link aggregator to process the second incoming data packet, wherein the second incoming data packet and the first incoming data packet are processed at a same time.

9. The non-transitory computer readable storage medium of claim 8, wherein to select the second link aggregator comprises accessing a statistics table to determine which link aggregator is under less load.

10. The non-transitory computer readable storage medium of claim 9, the processing device further to:
update the statistics table to reflect the selected link aggregator; and
set a source address associated with the data to the selected link aggregator.

11. The non-transitory computer readable storage medium of claim 10, wherein to update the statistics table comprises entering a characteristic of the data to the statistics table.

12. A system comprising:
a memory; and
a processing device, operatively coupled to the memory, to:
identify a plurality of network interface controllers (NICs) of a computing device that are available for link aggregation;
establish a first link aggregator for a first set of the plurality of NICs, wherein the first link aggregator handles incoming and outgoing network communications;
establish a second link aggregator for a second set of the plurality of NICs;
activate the first link aggregator;
activate the second link aggregator while maintaining the first link aggregator active;
associate a first medium access control (MAC) address with the first link aggregator;
associate a second MAC address with the second link aggregator;
receive a first incoming data packet and a second incoming data packet;
select, using the first MAC address, the first link aggregator to process the first incoming data packet; and
select, using the second MAC address, the second link aggregator to process the second incoming data packet, wherein the second incoming data packet and the first incoming data packet are processed at a same time.

13. The system of claim 12, wherein to select the second link aggregator, the processing device is to access a statistics table to determine which link aggregator is under less load.

14. The system of claim 13, the processing device further to:
update the statistics table to reflect the selected link aggregator; and
set a source address associated with the data to the selected link aggregator.

15. The system of claim 14, wherein to update the statistics table, the processing device is to enter a characteristic of the data to the statistics table.

16. The system of claim 12, wherein to identify the plurality of NICs that are available for link aggregation, the processing device is to probe the computing device to identify the plurality of NICs.

17. The method of claim 1, wherein establishing the first link aggregator for the first set of the plurality of NICs and establishing the second link aggregator for the second set of the plurality of NICs comprises applying one or more rules that use weights associated with each of the plurality of NICs.

18. The non-transitory computer readable storage medium of claim 8, wherein to establish the first link aggregator for the first set of the plurality of NICs and to establish the second link aggregator for the second set of the plurality of NICs comprises the processing device further to apply one or more rules that use weights associated with each of the plurality of NICs.

19. The system of claim 12, wherein to establish the first link aggregator for the first set of the plurality of NICs and to establish the second link aggregator for the second set of the plurality of NICs comprises the processing device further to apply one or more rules that use weights associated with each of the plurality of NICs.

* * * * *